(12) United States Patent
Praphul et al.

(10) Patent No.: US 9,778,747 B2
(45) Date of Patent: Oct. 3, 2017

(54) METHOD AND SYSTEM FOR MULTIMODAL AND GESTURAL CONTROL

(75) Inventors: Chandra Praphul, Bangalore Karnataka (IN); Parthasarathy Ranganathan, San Jose, CA (US); Sriganesh Madhvanath, Bangalore Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 646 days.

(21) Appl. No.: 13/978,033

(22) PCT Filed: Jan. 19, 2011

(86) PCT No.: PCT/US2011/021716
§ 371 (c)(1),
(2), (4) Date: Jul. 2, 2013

(87) PCT Pub. No.: WO2012/099584
PCT Pub. Date: Jul. 26, 2012

(65) Prior Publication Data
US 2013/0290911 A1   Oct. 31, 2013

(51) Int. Cl.
*G06F 3/01* (2006.01)
*G06F 3/02* (2006.01)
*G06F 3/038* (2013.01)

(52) U.S. Cl.
CPC ............ *G06F 3/017* (2013.01); *G06F 3/0227* (2013.01); *G06F 3/038* (2013.01); *G06F 2203/0381* (2013.01)

(58) Field of Classification Search
CPC ........ G06F 3/017; G06F 3/038; G06F 3/0227; G06F 2203/0381
See application file for complete search history.

(56) References Cited

U.S. PATENT DOCUMENTS 7,028,269 B1   4/2006   Honinklijke
7,231,609 B2   6/2007   Baudisch
(Continued)

FOREIGN PATENT DOCUMENTS

JP   1997-081309   3/1997
JP   1999-327753   11/1999
(Continued)

OTHER PUBLICATIONS

English translation (machine-generated) of Abstract from Japanese Patent Publication No. 2000222097 [retrieved on Aug. 6, 2014], Retrieved from the Internet: <http://worldwide.espacenet.com/publicationDetails/biblio?DB=worldwide.espacenet.com&II=1&ND=3&adjacent=true&locale=en_EP&FT=D&date=20000811&CC=JP&NR=2000222097A&KC=A>.

(Continued)

*Primary Examiner* — Justin R Blaufeld
(74) *Attorney, Agent, or Firm* — HP Inc. Patent Department

(57) ABSTRACT

Embodiments of the present invention disclose a multimodal and gestural control system. According to one embodiment, the multimodal and gestural control system is configured to detect a gesture command from a user via at least one device of a plurality of devices. A control operation and a destination device are both determined based on the gesture command such that the determined control operation is executed on the determined destination device.

12 Claims, 9 Drawing Sheets

(56) References Cited

U.S. PATENT DOCUMENTS

| | | | |
|---|---|---|---|
| 2003/0128244 A1 | 7/2003 | Soichiro et al. | |
| 2007/0124703 A1 | 5/2007 | Sohn | |
| 2008/0141329 A1* | 6/2008 | Igoe | 725/141 |
| 2009/0031240 A1 | 1/2009 | Hildreth | |
| 2009/0265470 A1 | 10/2009 | Shen et al. | |
| 2010/0013676 A1 | 1/2010 | Do et al. | |
| 2010/0149090 A1 | 6/2010 | Morris et al. | |
| 2010/0162177 A1 | 6/2010 | Eves et al. | |
| 2010/0199228 A1 | 8/2010 | Latta et al. | |
| 2010/0287513 A1 | 11/2010 | Singh et al. | |
| 2010/0302145 A1 | 12/2010 | Langridge | |
| 2011/0134047 A1* | 6/2011 | Wigdor et al. | 345/173 |
| 2011/0173574 A1* | 7/2011 | Clavin et al. | 715/863 |
| 2012/0110456 A1* | 5/2012 | Larco et al. | 715/728 |

FOREIGN PATENT DOCUMENTS

| | | |
|---|---|---|
| JP | 2000-222097 | 8/2000 |
| JP | 2001-216069 | 8/2001 |
| JP | 2003-186596 | 7/2003 |
| JP | 2005-242759 | 9/2005 |
| JP | 2007-318319 | 12/2007 |
| JP | 2009-037434 | 2/2009 |

OTHER PUBLICATIONS

English translation (machine-generated) of Abstract from Japanese Patent Publication No. 2001216069 [retrieved on Aug. 6, 2014], Retrieved from the Internet: <http://worldwide.espacenet.com/publicationDetails/biblio?DB=worldwide.espacenet.com&II=1&ND=3&adjacent=true&locale=en_EP&FT=D&date=20010810&CC=JP&NR=2001216069A&KC=A>.

English translation (machine-generated) of Abstract from Japanese Patent Publication No. 2003186596 [retrieved on Aug. 6, 2014], Retrieved from the Internet: <http://worldwide.espacenet.com/publicationDetails/biblio?DB=worldwide.espacenet.com&II=1&ND=3&adjacent=true&locale=en_EP&FT=D&date=20030704&CC=JP&NR=2003186596A&KC=A>.

English translation (machine-generated) of Abstract from Japanese Patent Publication No. 2005242759 [retrieved on Aug. 6, 2014], Retrieved from the Internet: <http://worldwide.espacenet.com/publicationDetails/biblio?DB=worldwide.espacenet.com&II=1&ND=3&adjacent=true&locale=en_EP&FT=D&date=20050908&CC=JP&NR=2005242759A&KC=A>.

English translation (machine-generated) of Abstract from Japanese Patent Publication No. 2007318319 [retrieved on Aug. 6, 2014], Retrieved from the Internet: <http://worldwide.espacenet.com/publicationDetails/biblio?DB=worldwide.espacenet.com&II=1&ND=3&adjacent=true&locale=en_EP&FT=D&date=20071206&CC=JP&NR=2007318319A&KC=A>.

English translation (machine-generated) of Abstract from Japanese Patent Publication No. 2009037434 [retrieved on Aug. 6, 2014], Retrieved from the Internet: <http://worldwide.espacenet.com/publicationDetails/biblio?DB=worldwide.espacenet.com&II=0&ND=3&adjacent=true&locale=en_EP&FT=D&date=20090219&CC=JP&NR=2009037434A&KC=A>.

English translation (machine-generated) of Abstract from Japanese Patent Publication No. JPH0981309 [retrieved on Aug. 6, 2014], Retrieved from the Internet: <http://worldwide.espacenet.com/publicationDetails/biblio?CC=JP&NR=H0981309A&KC=A&FT=D&ND=4&date=19970328&DB=worldwide.espacenet.com&locale=en_EP>.

English translation (machine-generated) of Abstract from Japanese Patent Publication No. JPH11327753 [retrieved on Aug. 6, 2014], Retrieved from the Internet: <http://worldwide.espacenet.com/publicationDetails/biblio?DB=EPODOC&II=0&ND=3&adjacent=true&locale=en_EP&FT=D&date=19991130&CC=JP&NR=H11327753A&KC=A>.

Lee, H., et al.; "Gesture-based Interface for Connection and Control of Multi-device in a Tabletop Display Environment"; 2009.

PCT; "Notification of Transmittal of the International Search Report and the Written Opinion of the International Searching Authority, or the Declaration"; PCT/US2011/021716, Sep. 27, 2011; 8 pages.

* cited by examiner

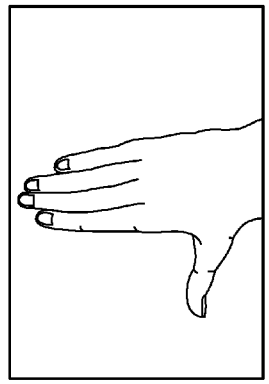
FIG. 3C
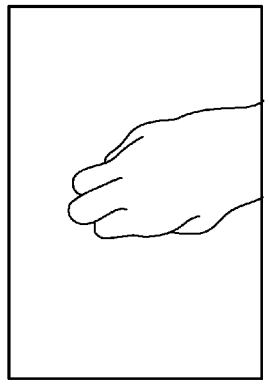
FIG. 3F
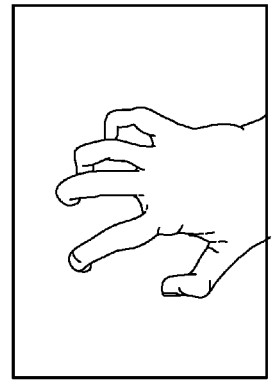
FIG. 3I
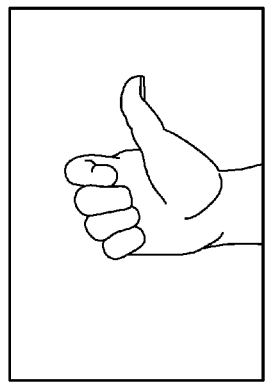
FIG. 3B
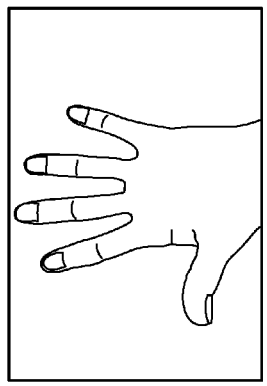
FIG. 3E
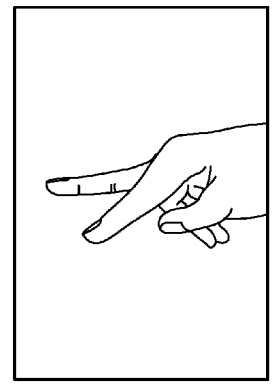
FIG. 3H
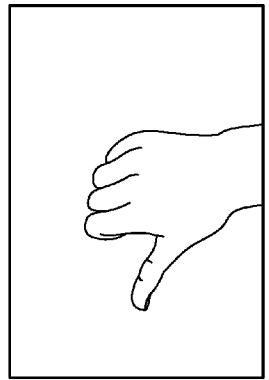
FIG. 3A
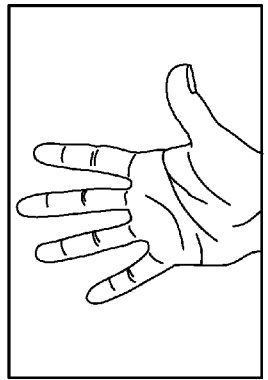
FIG. 3D
FIG. 3G

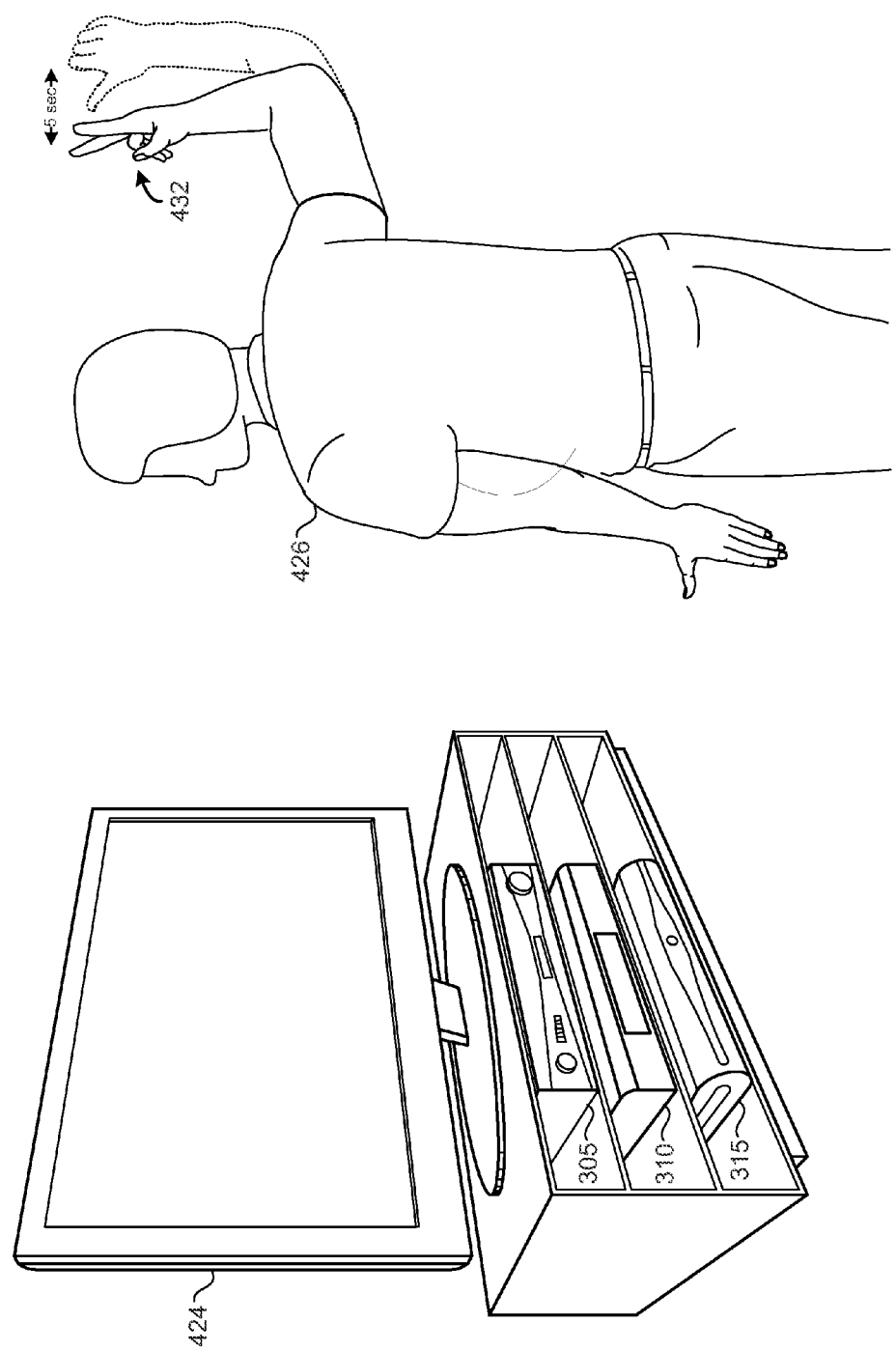

METHOD AND SYSTEM FOR
MULTIMODAL AND GESTURAL CONTROL

BACKGROUND

Due to constant changes in technology, home entertainment and particularly, home entertainment systems, have changed dramatically over the last decade. For example, today's entertainment system may include a three-dimensional (3D)-enabled television set, a digital video recorder, a blu-ray media player, and a video game system amongst others. Despite the many technological advances, each device of the entertainment system still some sort of physical operation from the user. Presently, infrared-based controllers are one of the most popular methods of controlling devices remotely. However, as the number of devices that require simultaneous operation increases, so does the number of controllers that a user must learn and operate.

BRIEF DESCRIPTION OF THE DRAWINGS

The features and advantages of the inventions as well as additional features and advantages thereof will be more clearly understood hereinafter as a result of a detailed description of particular embodiments of the invention when taken in conjunction with the following drawings in which:

FIGS. 3A-3I illustrate various gesture commands in accordance with an example of the present invention.

FIGS. 4A-4E illustrate various meta-interaction approaches for allowing a user to specify the particular device for which the interactions are intended according to an examples of the present invention.

DETAILED DESCRIPTION OF THE INVENTION

Figure 1:
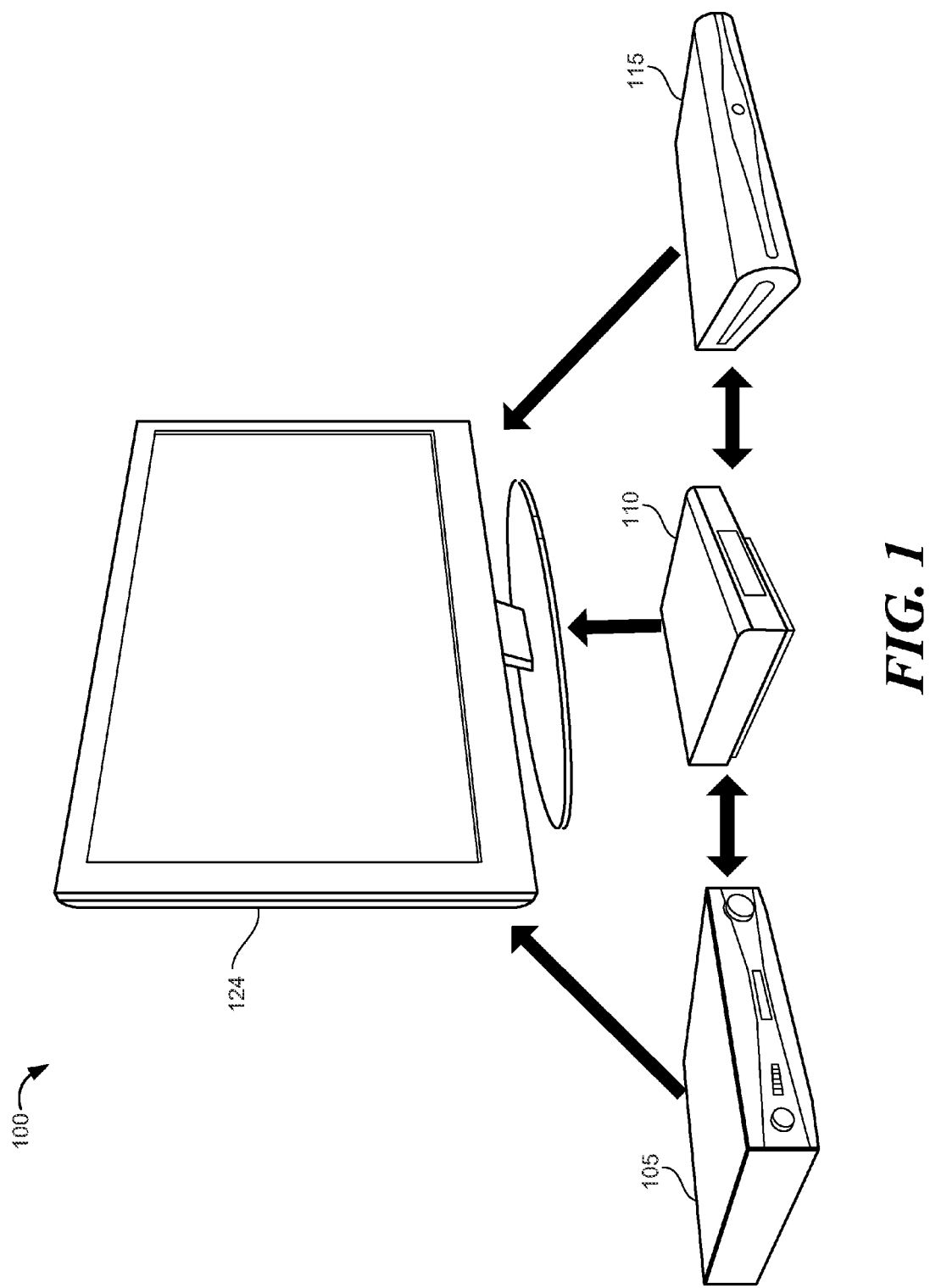
FIG. 1 is a three-dimensional perspective view of a multimodal and gestural control system according to an example of the present invention.

The following discussion is directed to various embodiments. Although one or more of these embodiments may be discussed in detail, the embodiments disclosed should not be interpreted, or otherwise used, as limiting the scope of the disclosure, including the claims. In addition, one skilled in the art will understand that the following description has broad application, and the discussion of any embodiment is meant only to be an example of that embodiment, and not intended to intimate that the scope of the disclosure, including the claims, is limited to that embodiment. Furthermore, as used herein, the designators "A", "B" and "N" particularly with respect to the reference numerals in the drawings, indicate that a number of the particular feature so designated can be included with examples of the present disclosure. The designators can represent the same or different numbers of the particular features.

The figures herein follow a numbering convention in which the first digit or digits correspond to the drawing figure number and the remaining digits identify an element or component in the drawing. Similar elements or components between different figures may be identified by the user of similar digits. For example, 143 may reference element "43" in FIG. 1, and a similar element may be referenced as 243 in FIG. 2, Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

A common solution to aforementioned problem is the use of universal remote controller to control multiple entertainment devices. Here, a single controller is configured to control multiple devices. The set of devices and the corresponding commands that the controller can issue over a communication channel (e.g. infrared) can be pre-configured or customized by the user. Typically, the physical controller is put in a particular mode such that all subsequent commands are meant for a particular device unless the mode is changed. However, physical controllers require frequent changing of the batteries, are often misplaced, and eventually wear down over time.

Another solution to the afore-mentioned problem is to enable control of multiple devices without the need of a physical controller through use of gesture control. In prior solutions, however, each device must contain a controller for detecting gestures from the user in addition to having its own unique interaction vocabulary (e.g. gesture command database), In addition, when a physical controller is missing, specifying the destination device for which the gesture is destined often becomes a challenge.

In the absence of a physical controller, another approach is to be able to determine the intended direction of a user's gestures by observing where he/she is pointing. This may be accomplished by processing ROB or infrared camera images of user's gestures, or through gaze detection. This approach works occasionally when the devices are physically separated in space. That is, multiple devices are configured to recognize visual gestures using independent cameras, with each device being physically separated in space such that only one camera at a time (e.g. front-facing camera) can accurately capture the user interaction and determine the destination device for the gesture. However, if multiple devices are in close proximity of each other, this approach does not work with the requisite accuracy, Examples of the present invention enable a user to specify a particular device when a user-action (i.e. gesture command) can be acted upon by multiple devices which are co-present. That is, examples of the present invention provide a single gesture and multimodal controller that can be used to control multiple entertainment devices. In particular, examples of the present invention utilize meta interactions, or interactions which do not result in any action but are useful for interpreting the interaction itself (i.e. the destination device of the interaction). Stated differently, when a user interacts with multiple devices in which two or more can be controlled via the same interaction mechanism, the multimodal and gestural control system helps to distinguish which device a particular interaction is intended for. As such, meta interactions and the gestural control system associated therewith are able to span several interaction modalities (i.e. multimodal) and enable fluid interactions with multiple proximate devices.

Referring now in more detail to the drawings in which like numerals identify corresponding parts throughout the views, FIG. 1 is a three-dimensional perspective view of a multimodal and gestural control system according to an example of the present invention. As shown here, the system 100 includes a display unit 124 coupled to a multitude of entertainment devices 105, 110, 115. According to one embodiment, display unit 124 is a digital television configured to facilitate the transmission of audio and video signals to an operating user. Entertainment devices 105, 110, 115 represent multimedia consumer electronic devices for pairing with the display unit 124 such as a satellite receiver, a digital video recorder (DVR), digital video disc player, a video game console, an audio-video (AV) receiver, and the like. In addition, a gesture detection controller may be embedded in at least one of the entertainment devices 105, 110, 115 along with the requisite sensors to feed the controller (e.g. cameras, microphones, infrared-cameras, etc.). The other entertainment devices may include standard wireless communication means such as infrared-based or radio frequency (RF) protocols. Examples of the present invention utilize both the spatial proximity of the multitude of entertainment devices 105, 110, and 115, and the broadcast nature of the wireless protocol. For example, when the gesture detection controller of the host device recognizes a gesture command from a user which is not destined for the host device, the host device is configured to convert the command into an alternate command code (e.g. infrared) which may be understood by other devices. The alternate command is then broadcast by the host device to the destination device using the appropriate code or media (e.g. infrared). Referring again to the example shown in FIG. 1, if entertainment device 110 contains the gesture controller and recognizes a gesture command from a user which is destined for entertainment device 105, entertainment device 110 may then create an infrared code (i.e. alternate command) associated with the received gesture command and broadcast the alternate command to the device 105. Since device 110 and device 105 are in close proximity, the infrared-receiver of device 105 receives this alternate infrared command and acts on it accordingly.

Furthermore, entertainment device 115 is unaffected by this command since the alternate command or infrared code is unique to entertainment device 105. Still further, display unit 124 may be one of the entertainment devices controlled via the host device.

Figure 2:
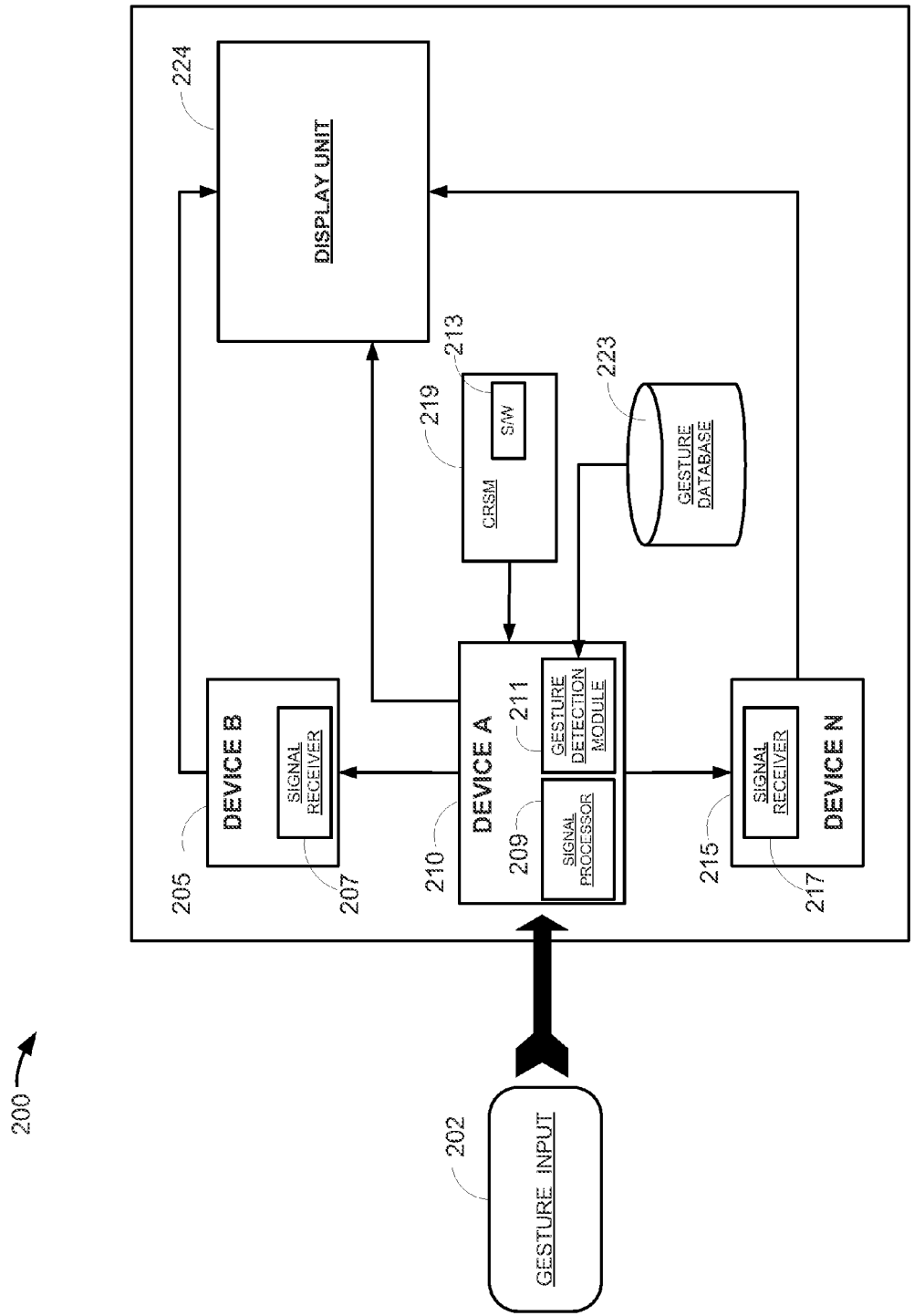
FIG. 2 is a simplified block diagram of the multimodal and gestural control system according to an example of the present invention.

FIG. 2 is a simplified block diagram of the multimodal and gestural control system according to an example of the present invention. As shown in this example, the system 200 includes a plurality of entertainment devices 205, 210, 215 (A, B, ... N), a display unit 224, a gesture database 223, and a computer-readable storage medium 211. The host or entertainment device 210 includes a gesture detection module 211 and a signal processor 209 for facilitating the gesture and multimodal control in accordance with examples of the present invention. More particularly, the gesture detection module 211 is coupled to a gesture database 223, which stores a list of gestures along with an associated operation command and destination device. According to one example, the signal processor 209 is configured to convert the gesture command to an alternate code or command (e.g. radio frequency), and emit the converted command for detection by the appropriate destination device. Devices 205 and 215 include a signal receiver 207 and 217 respectively for detecting the alternate signal emitted from the host entertainment device 210. Display unit 224 represents an electronic visual display configured to present video and images to a user such as a liquid crystal display (LCD) television, plasma display panel, cathode ray tube (CRT) display, video projector, or the like. Furthermore, display unit 224 may also include a signal receiver for detecting the alternate command signal broadcast from the host device. Storage medium 219 represents volatile storage (e.g. random access memory), non-volatile store (e.g. hard disk drive, read-only memory, compact disc read only memory, flash storage, etc.), or combinations thereof, Furthermore, storage medium 219 may include software 213 that is executable by the host device to perform some or all of the functionality described herein.

FIGS. 3A-3I illustrate various gesture commands in accordance with an example of the present invention. As shown in this example embodiment, FIG. 3A depicts a gesture command in which the user's hand forms a closed fist and a thumb pointing in a westward direction. Such a gesture command may be mapped to a "BACK" operation such as skipping to a previous chapter on a DVD player device, or rewinding thirty seconds on a DVR device. Similarly, FIG. 3B depicts a gesture command in which the user's hand forms a closed fist and a thumb is pointing in an eastward direction. This gesture may be mapped to a "FORWARD" operation such as skipping to a next chapter on a DVD player, or skipping forward thirty seconds on a DVR device. FIG. 3C depicts yet another gesture command in which the user's hand is open, fingers dose together, and the thumb is perpendicular to the index finger. Such a gesture may be mapped to a "STOP" operation such as stopping the playback of a blu-ray movie on a blu-ray entertainment device for example.

Still further, FIG. 3D depicts a gesture command in which the attributes of the users hand includes open, fingers essentially equal-distance apart, and the palm facing the user. Accordingly, this gesture may be mapped to an "OPEN" operation such as opening a saved file on a connected video game console for example. Similarly, FIG. 3E depicts a gesture command in which attributes of the users hand mimic that of FIG. 3D, but for the palm faces away from the user. According to one example, this gesture may be mapped to a "MAXIMIZE" operation for increasing the visual display area of an image or video shown on the display unit. Moreover, FIG. 3F depicts a gesture command in which the user's hand forms a closed fist. Here, this gesture command may be mapped to a "MINIMIZE" operation for decreasing the visual display area of an image or video shown on a connected display unit.

FIG. 3G depicts yet another gesture command in which the user's hand is closed except for the middle and index fingers, with the index finger pointing in an eastward direction and the middle finger pointing in a north direction. According to one example, such a gesture may be mapped to an "UNDO" operation in which the last received command is canceled or removed. FIG. 3H depicts a similar gesture command as FIG. 3G except that the index finger points in a westward direction. Conversely to FIG. 3G, the gesture of FIG. 3H may be mapped to a "REDO" operation such that previous command is applied. Still further, FIG. 3I depicts a gesture command in which each finger of the user's hand are curled inward so as to form claw-type gesture. Such a gesture command may mapped, via the gesture controller of the host device, to a "SAVE" operation for saving a data file on a particular destination device (e.g. save a photo on the hard drive of video game console). The above-described gesture commands are just one example of a small subset of the type of gestures that may be utilized by the system of the present invention. Furthermore, these gesture commands are simply used for example purposes only as each gesture may be mapped to any type of operation command.

By using a single gesture detection controller within a host entertainment device for controlling multiple devices as described above, there becomes a need to indicate the destination device for the particular gesture. However, providing a large set of gesture commands serves to increase the number of commands a user must learn and assimilate. Such a method also serves to increase the capability requirements of the sensor and the controllers for distinguishing amongst a larger set of commands. Thus, examples of the present invention provide a method that allows the user to overload a particular gesture command and then specify which device the command is meant or destined. Specifically, meta-interactions, or interactions which do not result in any action but are useful for interpreting the interaction itself, may be utilized to identify the destination device of a particular user interaction or gesture.

Figure 4A:
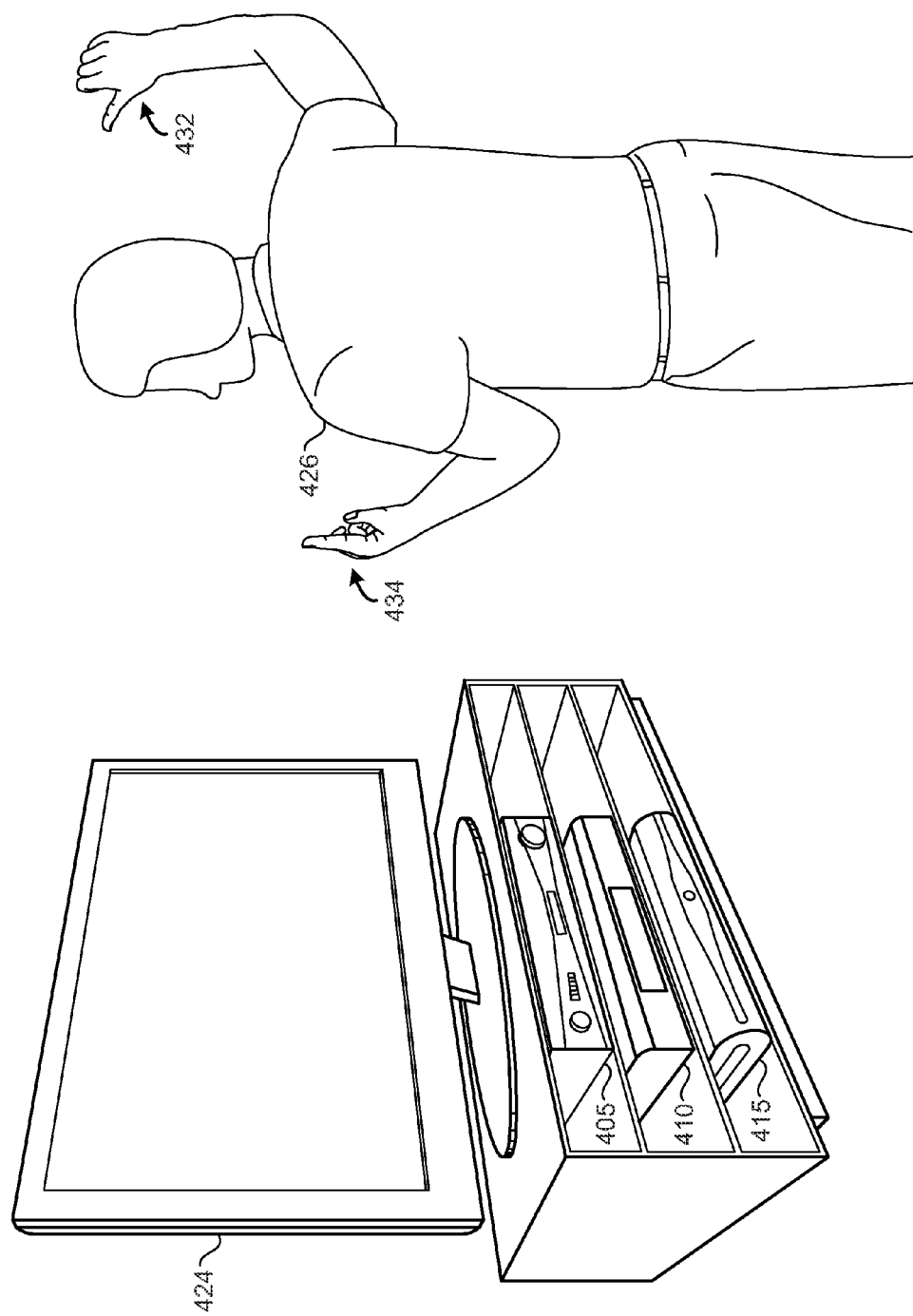

FIGS. 4A-4E illustrate various meta-interaction approaches for allowing a user to specify the particular device for which the interactions are intended according to an examples of the present invention. FIG. 4A depicts a "non-dominant hand" meta-interaction approach. According to this approach, the non-dominant hand 424 of the user 426 may be used for specifying the destination device while the dominant hand 432 is being used for gestures interactions. That is, certain postures or gestures made using the non-dominant hand 434 can be used to qualify the destination device for gesture commands being made using the dominant hand 432. As shown in the present example, the user 426 is forming a "BACK" gesture command with the dominant hand 424, while simultaneously holding up one finger with the non-dominant hand so as to indicate the destination entertainment device (i.e. device 1) for execution of the "BACK" operation.

Figure 4B:
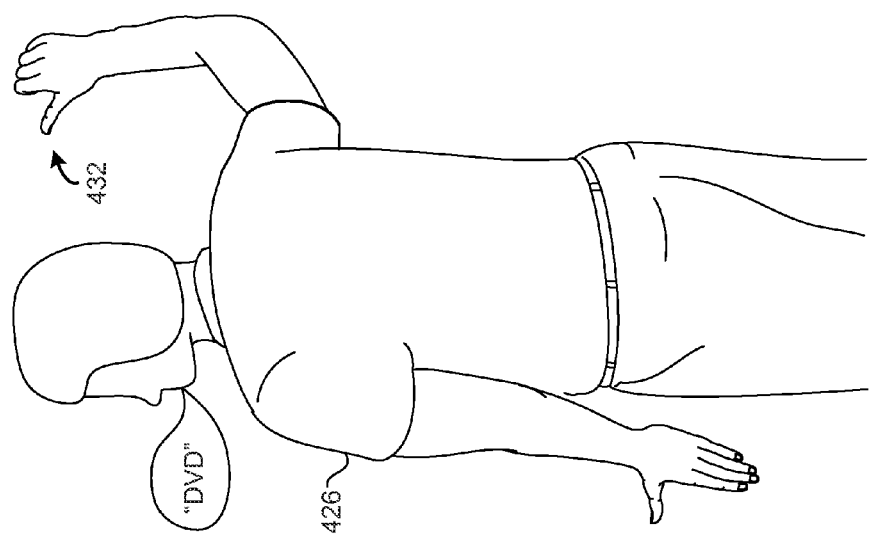
Figure 4B:
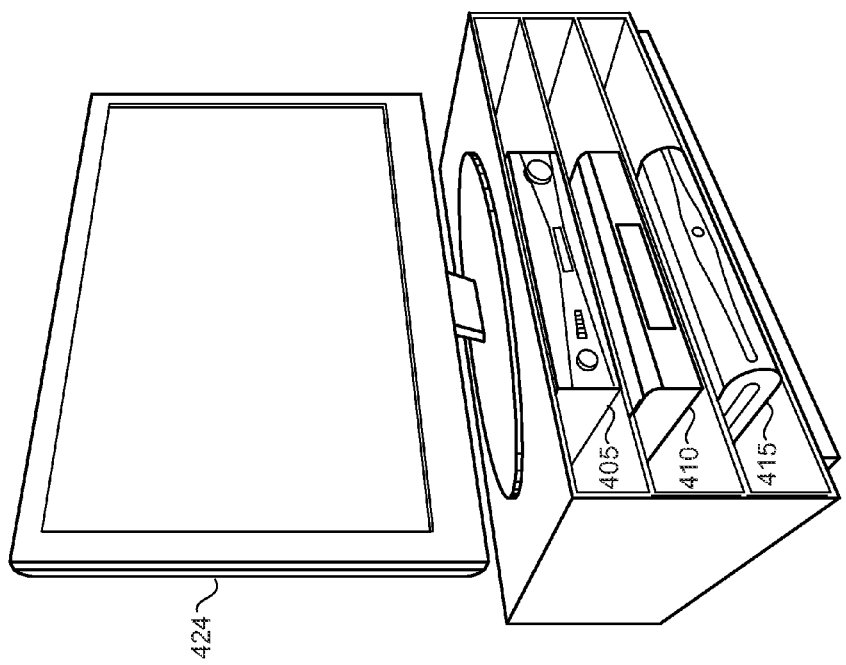

FIG. 4B depicts a "cross-modal" meta-interaction approach. Here, the meta-interaction may include a visual hand gesture accompanied by another modality (e.g. speech) which specifies the destination device. As shown in this example, a visual hand gesture for a "BACK" command may be accompanied by a speech tag such as "DVD" or "DVR" to specify which device the "BACK" command is meant to operate or control. FIG. 4C depicts yet another meta-interaction called the "temporal" approach. In this example, some gestures within the same interaction domain may act as meta-interactions that set the destination device unless future meta-interactions are received within a given time period. For example, the user 426 may select "device 2" as the destination device and then, within a predetermined time threshold (e.g. 5 seconds) and within the same interaction domain, form a gesture command (e.g. "GO BACK", "VOLUME UP", etc.) for operating the selected destination device. Alternatively, a particular gesture may act as a "toggle meta-interaction" to switch between different devices.

Figure 4D:
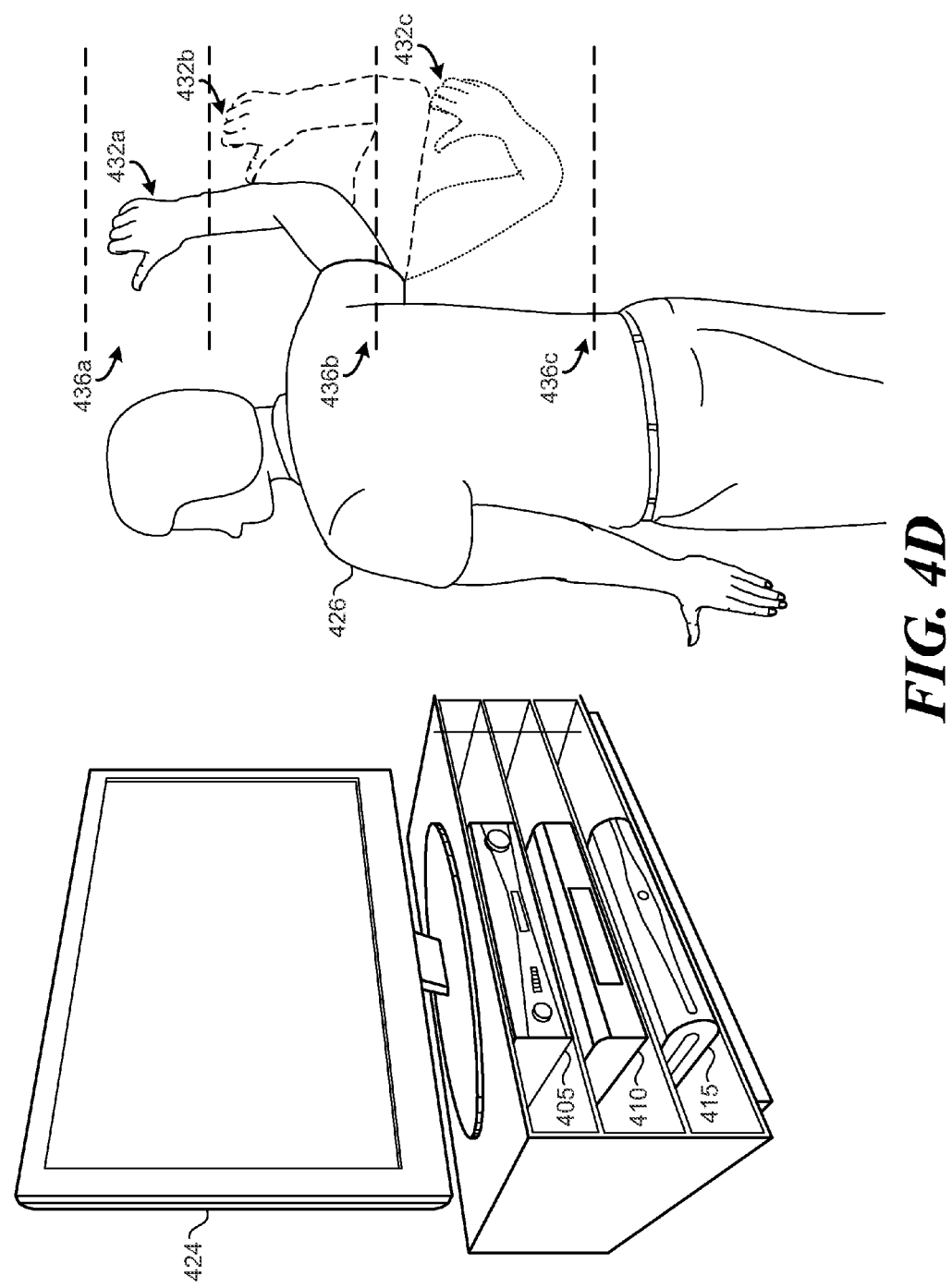

Referring now to FIG. 4D, a "spatial" meta-interaction approach is depicted. According to this example embodiment, the gesture recognition space of the interaction may be sub-divided into different spatial regions which are mapped to different devices such that an interaction triggered in a particular spatial region is destined towards a particular device. For example, if two entertainment devices are stacked on top of each other, visual hand gestures above a predetermined threshold (e.g. user's face or shoulders) may be assigned to the top-most device, while gesture commands below the threshold may be assigned to the device below the top-most device. In the example of FIG. 4D, a gesture command 436a within spatial region 436a (i.e. above the eyes of user 424) may be assigned to entertainment device 405, a gesture command 432b within spatial region 436b (i.e. between the eye level and shoulder level of the user 424) may be assigned to entertainment device 410, while a gesture command 432c within spatial region 436c (i.e. between the shoulder level and waist level of the user 424) may be assigned to entertainment device 415.

Figure 4E:
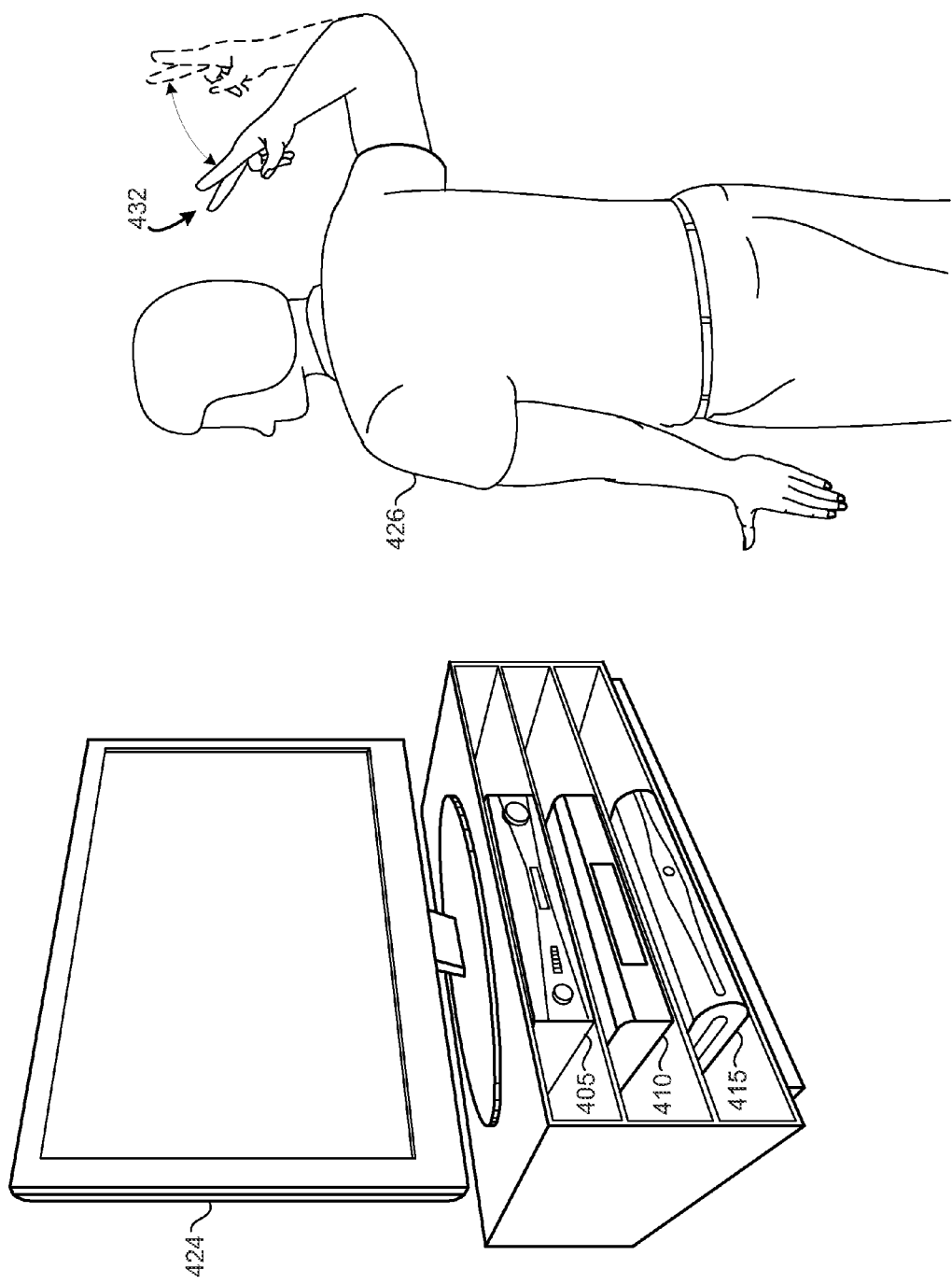

FIG. 4E depicts yet another meta-interaction approach ("gesture attributes") for controlling multiple devices. Here, the particular attributes of the gesture are analyzed for determining the appropriate destination device. More specifically, the meta-interaction may be embedded within the gesture command itself. In the example shown in FIG. 4E, a hand swipe gesture from left to right may mean "increase volume" of a particular device, while the number of fingers held-out while making the gesture may specify whether the gesture command is destined for the first device 405, second device 410, or third device 415. Here, the hand swipe gesture 432 includes two fingers so as to indicate to the host device to perform a volume increase operation on the second device 410 (the host device may even be the second device). In alternate example embodiment, meta-interactions may be interactive in the event that the destination of a gesture command is unclear and may be determined by letting the user choose among the plurality of entertainment devices using a display or graphical user interface.

Figure 5:
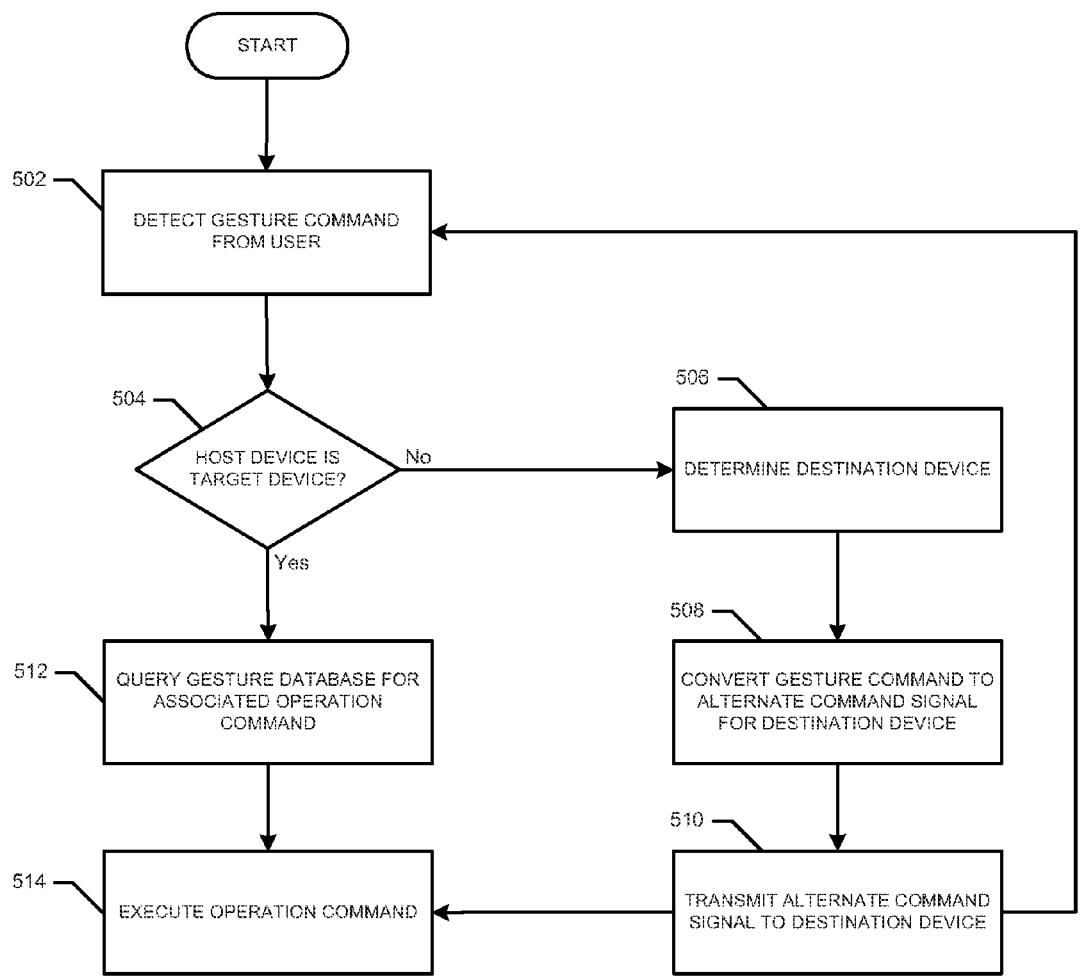
FIG. 5 is a simplified flow diagram of the processing steps for enabling multimodal and gestural control according to an example of the present invention.

FIG. 5 is a simplified flow diagram of the processing steps for enabling multimodal and gestural control according to an example of the present invention. In step 502, a gesture command from a user is detected by the gesture detection module of the host entertainment device. Next, in step 504, the host device analyzes the gesture command (e.g. meta-interactions) and determines if the destination device is the host device itself. If so, the gesture database is queried to determine the operation command associated with the received gesture command in step 512, and this operation command is executed on the host device in step 514. If the host device is not determined to be the desired destination device, however, then in step 506 the host device determines the appropriate destination device based on the meta-interactions described above for example. The gesture command is then converted to an alternate command signal (e.g. infrared) via the signal processor of the host device in step 508. Thereafter, the alternate command signal is broadcast or transmitted by the host device to the destination device in step 510. Based on the received command signal at the destination device, the associated operation command is executed thereon in step 514.

Many advantages are afforded by the multimodal and gestural control system in accordance with examples of the present invention. For instance, the gestural control system provides the user with the ability to control multiple devices with a single embedded gesture controller. As a result, the expense of manufacturing and deploying multiple sensors and gesture controllers on each entertainment device can be eliminated. Furthermore, the use of shared interaction language/vocabulary across multiple devices allows users to learn a small set of gestures thus increasing recall and use of these gesture commands. Moreover, a small interaction vocabulary helps to improve recognition of gestures commands by the embedded gesture controller of the host device.

Furthermore, while the invention has been described with respect to example embodiments, one skilled in the art will recognize that numerous modifications are possible. For instance, examples of the present invention are extensible to more than two or three entertainment devices and to interaction modalities other than visual gestures. Still further, the gesture control system may be equally effective when each device has its own gesture controller but the devices are so close so as to make existing gaze and pointing solutions unreliable. Also, similar to a single universal remote control being configured by a user to control multiple devices, examples of the present invention allow for manual configuration, or manual assignment of gestures and meta-interactions to a particular operation command.

Furthermore, the user can also add new gestures which are mapped to particular devices only or can add new meta-interactions when more devices are added in the setup. Meta-interactions can also specify that a particular command is meant for more than one device thus using a single gestural command to trigger action in multiple devices. Thus, although the invention has been described with respect to exemplary embodiments, it will be appreciated that the invention is intended to cover all modifications and equivalents within the scope of the following claims.

What is claimed is:

1. A method for providing multimodal and gestural control for a plurality of devices coupled to a display device, the method comprising:
    detecting a gesture command from a user via at least one device of the plurality of devices;
    determining both a control operation and a destination device from the plurality of devices based on the gesture command, the gesture command performed within a spatial location corresponding to one of a plurality of spatial locations defined according to a subdivision of physical attributes of the user, ones of the plurality of devices being mapped to respective ones of the plurality of spatial locations; and
    executing the determined control operation on the determined destination device.

2. The method of claim 1, further comprising:
    converting the gesture command to an alternate command signal, wherein the alternate command signal is detectable by the determined destination device; and
    transmitting the alternate command signal from t one device for detection by the destination device.

3. The method of claim 1, wherein the steps of detecting the gesture command and determining the destination device comprise:
    detecting the gesture of a first hand associated with the user to determine the control operation; and
    detecting the gesture of a second hand to determine the destination device for the control operation, the first hand being separate from the second hand.

4. The method of claim 1, wherein he step of determining the destination device further comprises:
    analyzing a voice input of the user to determine the destination device from the control operation.

5. The method of claim 1, wherein the step of determining the destination device comprises:
    analyzing a physical finger attribute of a hand of the user to determine the destination device for executing the control operation.

6. A multimodal and gestural control system comprising:
    an electronic display unit;
    a plurality of electronic devices coupled to the display unit, wherein at least one device includes a gesture detection module to detect gesture input from a user and determine both a control operation and a destination device of the plurality of electronic devices, the gesture input performed within a spatial location corresponding to one of a plurality of spatial locations defined according to a subdivision of physical attributes of the user, ones of the plurality of devices being mapped to respective ones of the plurality of spatial locations.

7. The system of claim 6, Therein the plurality of devices include a digital video recorder, a satellite receiver, a digital television set-top unit, or a multimedia player.

8. The system of claim 6, wherein the plurality of devices are in close proximity to each other.

9. The system of claim 6, wherein the at least one device of the plurality of devices comprises a host device having the gesture detection module for detecting gesture commands from the user.

10. The system of claim 9, wherein the host device is configured to convert the gesture input to an alternate signal and broadcast the alternate signal to the plurality of devices.

11. A multimodal and gestural control system comprising:
    a plurality of electronic devices; and
    a host electronic device having a gesture detection element to detect a gesture command from a user and determine a destination device of the plurality of electronic devices, the gesture command performed within a spatial location corresponding to one of a plurality of spatial locations defined according to a subdivision of physical attributes of the user, ones of the plurality of devices being mapped to respective ones of the plurality of spatial locations.

12. The system of claim 11, wherein the host device is further configured to convert the received gesture command to an alternate command signal, and wherein the host device is further configured to broadcast the alternate command signal to the plurality of devices for detection by the determined destination device.

* * * * *